United States Patent Office 3,772,360
Patented Nov. 13, 1973

---

3,772,360
ADAMANTYL SUBSTITUTED GLYCEROPHOSPHORYL (AND PHOSPHONYL) ETHANOLAMINES
Francis R. Pfeiffer, Cinnaminson, and Jerry A. Weisbach, Cherry Hill, N.J., assignors to Smithkline Corporation, Philadelphia, Pa.
No Drawing. Original application July 1, 1969, Ser. No. 838,327, now Patent No. 3,705,213. Divided and this application May 5, 1972, Ser. No. 250,830
Int. Cl. A23j 7/00; C07f 9/02
U.S. Cl. 260—403         2 Claims

ABSTRACT OF THE DISCLOSURE

The compounds are adamantyl substituted glycerophosphoryl (and phosphonyl) ethanolamines having renin inhibitory activity.

---

This is a division of application Ser. No. 838,327 filed July 1, 1969. Now Pat. No. 3,705,213.

This invention relates to adamantyl substituted glycerophosphoryl (and phosphonyl) ethanolamines.

The compounds of this invention have renin inhibitory activity. Renin is an enzyme which is released from the kidney into the bloodstream where it acts upon a substrate, an α-2-globulin, in blood plasma to form a decapeptide, angiotensin I. A converting enzyme acts upon this substance to produce angiotensin II which is a very potent pressor substance. A renin inhibitor is therefore useful in reducing blood pressure of renal hypertension.

The activity of the compounds of this invention as renin inhibitors is demonstrated at about 2 to 10 mg./ml. in a rat bioassay procedure as described by Pickens et al., Circulation Research 17: 438–448 (1965). Briefly, according to this procedure, the compound to be tested, renin and renin substrate are allowed to react in vitro and the angiotensin I formed during the in vitro procedure is measured by its pressor effects in anesthetized rats.

Antihypertensive activity of compounds of this invention is also demonstrated, for example, by administration to metacorticoid hypertensive rats at doses of about 40 mg./kg. orally.

The compounds of this invention are represented by the following formula:

FORMULA I $$\begin{array}{l} CH_2-O-R_1 \\ CH-O-R_2 \\ CH_2-R_3 \end{array}$$

in which:

$R_1$ is 1-adamantoyl; 1-adamantyl—$(CH_2)_n$; alkyl having 1 to 26 carbon atoms; alkenyl having 4 to 26 carbon atoms with from 1 to 3 non-conjugated carbon-carbon double bonds; alkanoyl having 2 to 26 carbon atoms; or alkenoyl having 4 to 26 carbon atoms with from 1 to 3 non-conjugated carbon-carbon double bonds;

$R_2$ is 1-adamantoyl; 1-adamantyl—$(CH_2)_n$; hydrogen; alkyl having 1 to 16 carbon atoms; alkenyl having 4 to 16 carbon atoms with from 1 to 3 non-conjugated carbon-carbon double bonds; alkanoyl having 2 to 16 carbon atoms; or alkenoyl having 4 to 16 carbon atoms with from 1 to 3 non-conjugated carbon-carbon double bonds, at least one of $R_1$ and $R_2$ being 1-adamantoyl or 1-adamantyl—$(CH_2)_n$;

$n$ is 0 to 2;

$$R_3 \text{ is } -O-\overset{O}{\underset{OH}{\overset{\|}{P}}}-O-CH_2CH_2R_4, -O-\overset{O}{\underset{OH}{\overset{\|}{P}}}-CH_2CH_2R_4 \text{ or}$$

$$-\overset{O}{\underset{OH}{\overset{\|}{P}}}-O-CH_2CH_2R_4; R_4 \text{ is } N\overset{R_5}{\underset{R_6}{\diagdown}} \text{ or } \overset{\oplus}{N}(R_7)_3 X^{\ominus};$$

$R_5$ and $R_6$ are hydrogen or lower alkyl;
$R_7$ is lower alkyl and
X is a pharmaceutically acceptable anion, preferably hydroxy or halogen.

Advantageous compounds of this invention are represented by Formula I in which $R_1$ is 1-adamantoyl or 1-adamantyl—$(CH_2)_n$.

Preferred compounds of this invention are represented by Formula I in which $R_1$ is 1-adamantoyl; $R_2$ is 1-adamantoyl or hydrogen and $R_3$ is $$-O-\overset{O}{\underset{OH}{\overset{\|}{P}}}-O-CH_2CH_2NH_2 \text{ or } -O-\overset{O}{\underset{OH}{\overset{\|}{P}}}-O-CH_2CH_2\overset{\oplus}{N}(CH_3)_3OH^{\ominus}.$$

The compounds of this invention are prepared by the following procedures:

FORMULA II         FORMULA III $$\begin{array}{l} CH_2-OH \\ CH-OH \\ CH_2-R_8 \end{array} \longrightarrow \begin{array}{l} CH_2-O-R_1 \\ CH-O-R' \\ CH_2-R_8' \end{array} \longrightarrow \begin{array}{l} CH_2-O-R_1 \\ CH-O-R_2 \\ CH_2-R_3 \end{array}$$

The terms $R_1$, $R_2$ and $R_3$ are as previously defined; $R'$ is $R_2$ as previously defined except that $R'$ is not hydrogen; $R_8$ is hydroxy, 2,2,2-trichloroethoxycarbonyloxy, benzyloxy or iodo; and $R_8'$ is hydroxy when $R_8$ is hydroxy, 2,2,2-trichloroethoxycarbonyloxy or benzyloxy, or iodo when $R_8$ is iodo.

The adamantyl substituted intermediates of Formula III are prepared by incorporating 1-adamantoyl or 1-adamantyl—$(CH_2)_n$— on one or two hydroxy groups of a glycerol starting material of Formula II. Other hydroxy groups may be protected during the reaction by, for example, 2,2,2-trichloroethoxycarbonyl, benzyl, 1,2-isopropylidene or 1,3-benzylidene groups. The hydroxy protecting groups are then removed to give the intermediates of Formula III. The preparation of the intermediates of Formula III is carried out generally by methods known to the art for preparing O-substituted glycerol compounds, for example as follows:

(A)

$$\begin{array}{l} CH_2-OH \\ CH-OH \\ CH_2-OCOCH_2CCl_3 \\ \phantom{CH_2-OCO}\|\\ \phantom{CH_2-OCOCH_2CC}O \end{array} + Ad-\overset{O}{\overset{\|}{C}}-Cl \longrightarrow$$

$$\begin{array}{l} CH_2-O-\overset{O}{\overset{\|}{C}}-Ad \\ CH-O-\overset{O}{\overset{\|}{C}}-Ad \\ CH_2-OCOCH_2CCl_3 \\ \phantom{CH_2-OCO}\|\\ \phantom{CH_2-OCOCH_2CC}O \end{array} \longrightarrow \begin{array}{l} CH_2-O-\overset{O}{\overset{\|}{C}}-Ad \\ CH-O-\overset{O}{\overset{\|}{C}}-Ad \\ CH_2-OH \end{array}$$

According to procedure A, glycerol 3-(2,2,2-trichloroethyl)carbonate is reacted with 1-adamantoyl chloride and the trichloroethoxycarbonyl group is removed from the resulting 1,2-di(1-adamantoyl) compound with acid.

(B)

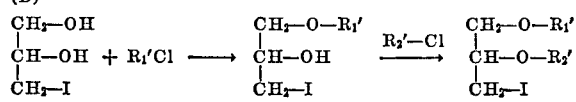

According to procedure B, glycerol-1-iodohydrin is reacted with an acyl chloride ($R_1'Cl$) and the resulting 1-acylglycerol-3-iodohydrin is reacted with an acyl chloride ($R_2'Cl$) to give a 1,2-diacylglycerol-3-iodohydrin in which the acyl groups may be the same or different.

(C)

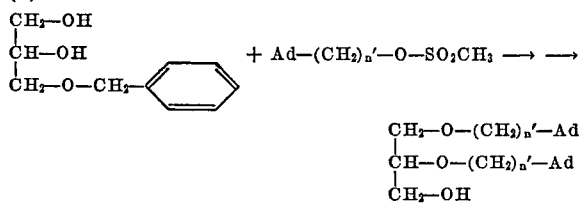

According to procedure C, a 1-benzylglycerol is reacted with a 1-adamantyl—$(CH_2)_n$, methylsulfonate and the benzyl group is removed from the resulting intermediate by hydrogenation using a catalyst such as palladium in a solvent such as ethyl acetate or acetic acid.

To prepare 1,2-di(1-adamantyl)glycerol, a 1-benzylglycerol is reacted with two molar equivalents of toluenesulfonyl chloride, the resulting 1,2-di(toluenesulfonyl)-3-benzylglycerol is reacted with two molar equivalents of the sodium salt of 1-adamantanol (prepared by reacting 1-adamantanol with sodium hydride in dimethylsulfoxide) and the benzyl group is removed from the resulting intermediate by hydrogenation.

(D)

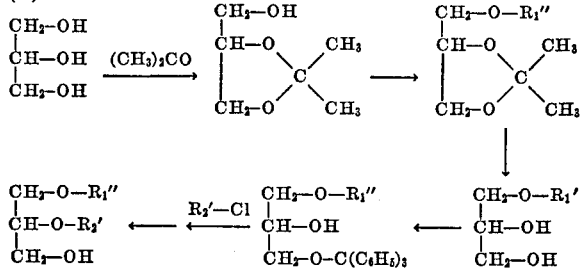

According to procedure D, glycerol is reacted with acetone, the resulting 1,2-isopropylideneglycerol is reacted with a methylsulfonate or a lower alkyl iodide and the resulting 1-$R_2''$-2,3-isopropylideneglycerol is treated with acid to give the 1-$R_1''$ substituted glycerol. The 1-$R_1''$ substituted glycerol is reacted with trityl chloride and then the resulting 3-trityl compound is treated with an acyl chloride ($R_2'$—Cl) and the trityl group is removed using boric acid to give the glycerol having an ether group in the 1-position and an ester group in the 2-position.

To prepare 1-(1-adamantyl) compounds, 1,2-isopropylideneglycerol is reacted with toluenesulfonyl chloride, the resulting 1-toluenesulfonyl-2,3-isopropylideneglycerol is reacted with the sodium salt of 1-adamantanol and the resulting 1-(1-adamantyl)-2,3-isopropylideneglycerol is treated with acid to give 1-(1-adamantyl)glycerol. An ester group is incorporated in the 2-position by the procedure described above. Alternatively, a 1-adamantyl group is incoporated in the 2-position by treating 1-(1-adamantyl) glycerol with trityl chloride, then reacting the resulting 1-(1-adamantyl)-2-toluenesulfonyl-3-tritylglycerol with the sodium salt of 1-adamantanol and then removing the trityl group by acid hydrolysis to give 1,2-di(1-adamantyl)glycerol.

(E)

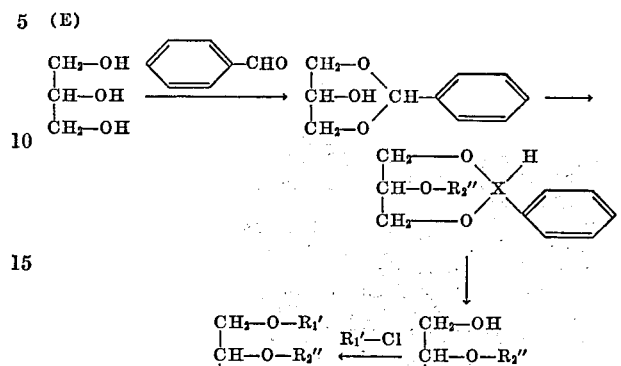

According to procedure E, glycerol is reacted with benzaldehyde to give 1,3-benzylideneglycerol which is reacted with a methylsulfonate or a lower alkyl iodide and the resulting 2-$R_2''$-1,3-benzylideneglycerol is treated with acid to give the 2-$R_2''$ substituted glycerol. The 2-$R_2''$ substituted glycerol is reacted with an acyl chloride ($R_1'$—Cl) to give the glycerol having an ester group in the 1-position and an ether group in the 2-position.

To prepare 2-(1-adamantyl) compounds, 1,3-benzylideneglycerol is reacted with toluenesulfonyl chloride, the resulting 2-toluenesulfonyl-1,3-benzylideneglycerol is reacted with the sodium salt of 1-adamantanol and the resulting 2-(1-adamantyl)-1,3-benzylideneglycerol is treated with acid. By the procedure described above, an ester group is incorporated in the 1-position.

Procedures D and E above may also be used to prepare glycerols having two ether groups, the same or different, in the 1 and 2 positions by using a methylsulfonate or a lower alkyl iodide in place of $R_2'$—Cl in procedure D to give a 2-$R_2''$ substituted glycerol and in place of $R_1'$—Cl in procedure E to give a 1-$R_1''$ substituted glycerol.

In the above procedures A to E, the terms $R_1'$ and $R_2'$ are 1-adamantoyl, alkanoyl or alkenoyl; $R_1''$ and $R_2''$ are 1-adamantyl—$(CH_2)_n'$, alkyl or alkenyl, at least one of $R_1'$ and $R_2'$ and one of $R_1''$ and $R_2''$ being 1-adamantoyl or 1-adamantyl—$(CH_2)_n'$; $n'$ is 1 or 2; and Ad is 1-adamantyl.

The intermediate of Formula III are converted to the phosphoryl(and phosphonyl)ethanolamines by the following procedures:

(I)

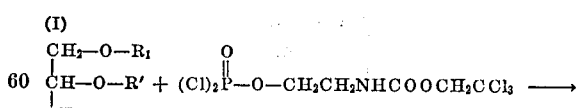

According to procedure I, an adamantyl substituted glycerol intermediate is reacted with dichloro N-(2,2,2-trichloroethoxycarbonyl)-2-aminoethyl phosphate in the presence of a base such as pyridine and the resulting intermediate is treated with zinc in acetic acid to give the adamantyl substituted glycerophosphoylethanolamine.

(II)

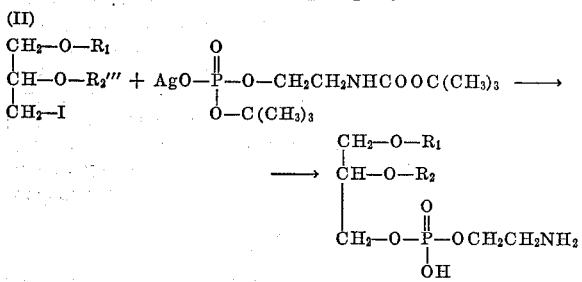

By the method of procedure II, an adamantyl substituted glycerol-3-iodohydrin is reacted with silver t-butyl (N-t-butyloxycarbonyl-2-aminoethyl) phosphate and the resulting intermediate is treated with acid to give the adamantyl substituted glycerophosphoylethanolamine.

(III)

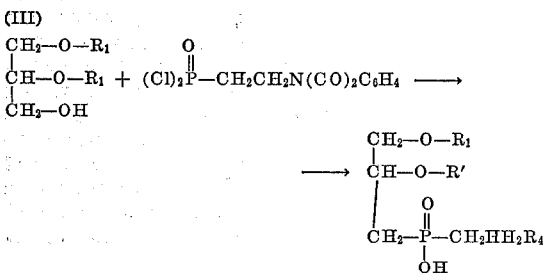

According to procedure III, an adamantyl substituted glycerol intermediate is reacted with dichloro phthalimidoethylphosphonic acid and the resulting intermediate is treated with hydrazine to give the adamantyl substituted propyl ester of 2-aminoethylphosphonic acid.

(IV)

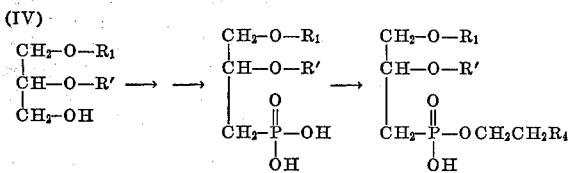

According to procedure IV, an adamantyl substituted glycerol intermediate is treated with toluenesulfonyl chloride and the resulting 3-toluenesulfonyl glycerol is treated with sodium diethyl phosphonate and the resulting glycerophosphonate is treated with base to give the adamantyl substituted glycerophosphonic acid which is then converted to the optionally N-substituted aminoethyl or quaternary ammonium ethyl ester.

(V)

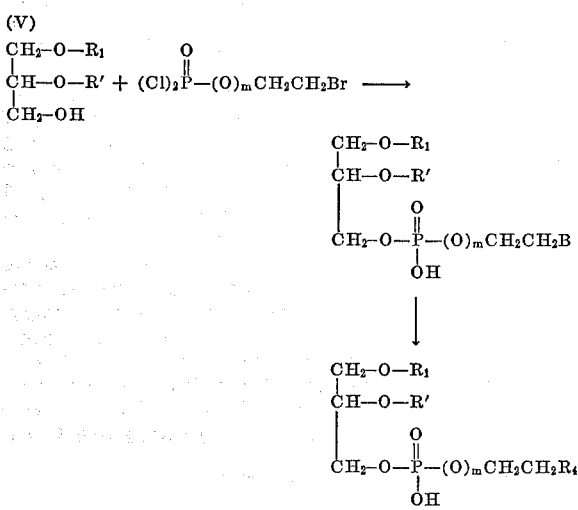

$m$ is 0 or 1

According to procedure V, an adamantyl substituted glycerol intermediate is reacted with a dichloro 2-bromo-ethyl phosphate or phosphonic acid and the resulting intermediate is reacted with an optionally N-substituted amine to give the optionally N-substituted aminoethyl or quaternary ammonium ethyl ester of an adamantoyl substituted glycerophosphoric acid or an adamantyl substituted propyl ester of the optionally N-substituted aminoethyl (or quaternary ammonium ethyl) phosphonic acid.

In the above procedures I to V, the terms $R_1$, $R_2$ and $R_4$ are as previously defined; $R'$ is $R_2$ as previously defined except $R'$ is not hydrogen; and $R_2'''$ is $R'$ as defined above or t-butyl.

The compounds of this invention (Formula I) in which $R_2$ is hydrogen are alternatively prepared by treating a compound of Formula I in which $R_2$ is alkanoyl or alkenoyl with phospholipase "A."

As indicated in the following examples the intermediates and the products of this invention may be purified by chromatography using adsorbents such as Florisil (magnesium-silica gel), silica gel, alumina or Super-Cel (infusorial earth).

The term "phosphatidyl" is used herein to refer to diacyl glycerophosphoyl.

The following examples are not limiting but are illustrative of the compounds of this invention and methods of preparing them.

EXAMPLE 1

A solution of 28.2 g. of 1-adamantoyl chloride in 100 ml. of dry chloroform is added dropwise to a solution of 20 g. of sn-glycerol 3-(2,2,2-trichloroethyl)carbonate, 14 ml. of pyridine and 100 ml. of chloroform. The solution is stirred overnight and then diluted with 800 ml. of ether and washed with dilute hydrochloric acid, water, 5% aqueous sodium bicarbonate solution and then water. The solution is dried over sodium sulfate and concentrated. The residue is crystallized from methanol to give 1,2-di(1-adamantoyl)-sn-glycerol 3-(2,2,2-trichloroethyl)carbonate.

Activated zinc (48 g.) is added to a solution of 23.2 g. of 1,2-di(1-adamantoyl)-sn-glycerol 3-(2,2,2-trichloroethyl)carbonate in 150 ml. of 80% acetic acid and 200 ml. of ether and the suspension is stirred vigorously for three hours, then filtered. The filtrate is washed with saturated aqueous sodium bicarbonate solution to pH 7, then dried over sodium sulfate and concentrated. The residue is crystallized from hexane to give 1,2-di(1-adamantoyl)-sn-glycerol.

A solution of 4.17 g. of 1,2-di(1-adamantoyl)-sn-glycerol in 3.5 ml. of dry pyridine and 15 ml. of dry chloroform is added dropwise to an ice cold solution of 4.2 g. of dichloro N-(2,2,2-trichloroethoxycarbonyl)-2 - aminoethyl phosphate in 15 ml. of dry chloroform with stirring for two hours. After standing overnight at 25° C., the mixture is concentrated at 225° C. and then dissolved in 200 ml. of ether. The ether solution is washed with dilute hydrochloric acid, water, 5% aqueous sodium bicarbonate solution and water, then dried over sodium sulfate and concentrated. To the residue is added 25 ml. of 95% acetic acid and 25 ml. of ether. Activated zinc (10 g.) is added and the suspension is stirred at 25° C. overnight. The mixture is concentrated at 25° C. and then dissolved in is chromatographed using a 2:1 silica gel-Super-Cel column and eluting with chloroform-methanol mixtures. Concentrating in vacuo and recrystallizing the residue from chloroform-petroleum ether gives 1,2 - di(1 - adamantoyl)-3-sn-phosphatidylethanolamine.

EXAMPLE 2

A solution of 29.0 g. of 1-adamantoyl chloride in 75 ml. of dry chlorform is added dropwise to a solution of 35 g. of glycerol-L-1-iodohydrin, 13.25 ml. of dry pyridine and 100 ml. of dry chloroform, cooled and stirred at 0° C. The solution is then stirred overnight at room temperature in the dark, diluted with ether, washed with ice cold sulfuric acid, water, 10% aqueous sodium bisulfite solution, water, 5% aqueous sodium bicarbonate solution and water, dried over sodium sulfate and concentrated. The residue is chromatographed on 1500 g. of Florisil and eluted with 4:1 petroleum ether-ether and ether. Fractions 11–25 are recrystallized from cyclohexane-petroleum ether to give 1-(1-adamantoyl)glycerol-L-3-iodohydrin.

A solution of 7.8 g. of 7-palmitoleoyl chloride in 30 ml. of dry chloroform is added dropwise to a solution of 14.05 g. of 1-(1-adamantoyl)glycerol-L-3-iodohydrin, 2.39 ml. of pyridine and 30 ml. of dry chloroform, stirred and cooled at 0° C. The solution is stirred at room temperature under nitrogen in the dark for two days, diluted with ether, washed with cold 0.5 N sulfuric acid, water, 10% aqueous sodium bisulfite solution water, 5% aqueous sodium bicarbonate solution and water. The mixture is dried over sodium sulfate and concentrated. The residue is chromatographed on an alumina column and eluted with petroleum ether and ether to give 1-(1-adamantoyl)-2-(7-palmitoleoyl)glycerol-L-3-iodohydrin.

A mixture of 1.75 g. of 1-(adamantoyl) - 2 - (7 - palmitoleoyl)glycerol-L - 3 - iodohydrin and 200 ml. of dry benzene is azeotroped to 150 ml., then cooled slightly. Silver t-butyl (N-t-butoxycarbonyl-2-aminoethyl) phosphate (1.24 g.) is added. Another 50 ml. of benzene is azeotroped and removed. The mixture is then refluxed in absence of light for 1.5 to 2 hours. The mixture is filtered using ether. The filtrate is washed with aqueous sodium bicarbonate solution and water, then dried over sodium sulfate and dissolved in about 250 ml. of dry ether. Dry hydrogen chloride is bubbled into the solution for about two hours. The mixture is evaporated in vacuo and the residue is dissolved in 50 ml. of 4:2:1 ether-ethanol-water and put through a column containing a weakly basic anion exchange resin (hydroxyl form) to give 1-(1-adamantoyl)-2-(7-palmitoleoyl)-3-sn - phosphatidylethanolamine. This material is further purified by chromatography on 2 mm. silica gel preparative plates using 65:25:4 chloroform-methanol-water as the moving phase.

EXAMPLE 3

A mixture of 10 mg. of 1-(1 - adamantoyl) - 2 - (7-palmitoleoyl)-3-sn - phosphatidylethanolamine (prepared as in Example 2), 2 mg. of phospholipase "A" [lypholized venom from Eastern diamondback rattlesnake (*Crotalus adamanteus*)], 2 ml. of tris(hydroxymethyl)aminomethane buffer (pH 7.2) containing a few drops of $2.5 \times 10^{-3}$ M aqueous calcium chloride solution and 2 ml. of ether is stirred under nitrogen at 25 to 37° C. overnight. The mixture is diluted with chloroform, dried over magnesium sulfate and filtered. The filtrate is concentrated to give 1-(1-adamantoyl) - 3 - glycerophosphorylethanolamine.

EXAMPLE 4

A solution of 2.02 g. of 10 - undecenoyl chloride in 20 ml. of dry chloroform is added dropwise to a solution of 3.64 g. of 1-(1-adamantoyl)glycerol-L-3-iodohydrin (prepared as in Example 2), 50 ml. of dry chloroform and 0.62 ml. of dry pyridine, cooled and stirred at 0° C. The mixture is stirred at room temperature for two days under nitrogen in the dark. The solution is then diluted with ether, washed with ice cold 0.5 N sulfuric acid, water, 10% aqueous sodium bisulfite solution, water, 5% aqueous sodium bicarbonate solution and water, dried over sodium sulfate and concentrated. The residue is chromatographed, using an alumina column and petroleum ether and ether as eluants, to give 1-(1-adamantoyl)-2-(10-undecenoyl)glycerol-L-3-iodohydrin.

1 - (1 - adamantoyl) - 2 - (10-undecenoyl)glycerol-L-3-iodohydrin (1.19 g.) is azeotroped with dry benzene. Dry benzene (125 ml.) and 1 g. of silver t-butyl (N-t-butyloxycarbonyl-2-aminoethyl) phosphate are added and the mixture is refluxed for 2.5 hours under nitrogen in the dark. The hot reaction mixture is filtered through Super-Cel, washed with 5% aqueous sodium carbonate solution and water, dried over sodium sulfate and concentrated. The residue is dissolved in 100 ml. of dry ether. The solution is ice cooled and dry gaseous hydrogen chloride is bubbled in for two hours. The solvents are concentrated and the residue chromatographed on 25 g. of a weakly basic anion exchange resin (hydroxyl form) eluting with 200 ml. of 4:2:1 ether-ethanol-water. The eluate is concentrated and the residue chromatographed on thin-layer chromatography plates (silica gel) in 65:25:4 chloroform-methanol-water. The major component is located under ultraviolet, cut out, eluted with 2:1 chloroform-methanol and recrystallized from chloroform-acetone to give 1-(1-adamantoyl)-2-(10-undecenoyl)-3-sn-phosphatidylethanolamine.

EXAMPLE 5

A solution of 1.81 g. of 1-adamantoyl chloride in 80 ml. of dry chloroform is added dropwise to a solution of 4.23 g. of 1-oleoylglycerol-L-3-iodohydrin (prepared from glycerol-L-1-iodohydrin and oleoyl chloride by the procedure described for the preparation of 1-adamantoyl-glycerol-L-3-iodohydrin in Example 2), 0.742 ml. of dry pyridine and 75 ml. of dry chloroform, cooled and stirred under nitrogen. The reaction mixture is stirred in the dark under nitrogen for two days and then heated at 40–45° C. for 18 hours, diluted with ether and washed with ice cold 0.5 N sulfuric acid, water, 10% aqueous sodium bisulfite solution, water, 5% aqueous sodium bicarbonate solution and then water. The mixture is dried over sodium sulfate and concentrated. The residue is chromatographed on a Florisil column eluting with 20:1 petroleum ether-ether to give 1-oleoyl-2-(1-adamantoyl) glycerol-L-3-iodohydrin.

A solution of 2.2 g. of 1-oleoyl-2-(1-adamantoyl) glycerol-L-3-iodohydrin in 200 ml. of dry benzene is azeotroped in dry glassware. About 75 ml. of benzene is removed and 1.55 g. of silver t-butyl (N-t-butyloxycarbonyl-2-aminoethyl)phosphate (dried at 40° C. for 18 hours) is added. The mixture is stirred and refluxed in the dark for 1.5 hours, then filtered with ether. The filtrate is washed with dilute aqueous sodium bicarbonate solution and water, then dried and concentrated. The residue is dissolved in 150 ml. of dry ether. At 0° C. (ice bath) dry hydrogen chloride is introduced into the solution for 1.5 hours.

The solvents are evaporated off at 30° C. and the residue is perculated through a column containing a weakly basic anion exchange resin (hydroxyl form) using about 400 ml. of 4:2:1 ether-ethanol-water as eluant. The eluate is concentrated and then azeotroped with ethanol and then benzene to give 1-oleoyl-2-(1-adamanfoyl)-3-sn-phosphatidylethanolamine.

EXAMPLE 6

A solution of 1.78 g. of 1-adamantoyl chloride in 80 ml. of dry chloroform is added dropwise to a solution of 4.68 g. of 1-stearoylglycerol-L-3-iodohydrin (prepared from glycerol-L-1-iodohydrin and stearoyl chloride by the procedure described for the preparation of 1-adamantoylglycerol-L-3-iodohydrin in Example 2), 0.77 ml. of dry pyridine and 80 ml. of dry chloroform, cooled and stirred under nitrogen. The reaction mixture is stirred in the dark for two days and heated at 40–45° C. for 18 hours. Working up as in Example 5 gives 1-stearoyl-2-(1-adamantoyl)glycerol-L-3-iodohydrin.

According to the procedure of Example 5, the above prepared 1 - stearoyl-2-(1-adamantoyl)glycerol-L-3-iodohydrin is reacted with silver t-butyl (N-t-butyloxycarbonyl-2-aminoethyl)phosphate and the resulting intermediate is dissolved in dry ether and treated with dry hydrogen chloride and then passed through a weakly basic anion exchange resin column (hydroxyl form) to give 1 - stearoyl - 2-(1-adamantoyl)-3-sn-phosphatidylethanolamine.

EXAMPLE 7

A solution of 1.72 g. of 1-adamantoyl chloride in 50 ml. of dry chloroform is added dropwise to a solution of 11 g. of 1-linolenoylglycerol-L-3-iodohydrin (prepared from glycerol-L-1-iodohydrin and linolenoyl chloride by the procedure described for the preparation of 1-adamantoylglycerol-L-3-iodohydrin in Example 2), 0.77 ml. of dry pyridine and 50 ml. of dry chloroform, stirred and cooled at 0° C. under nitrogen. The mixture is then stirred at room temperature for five days under nitrogen in the dark, diluted with ether, washed with ice cold dilute hydrochloric acid, water, 10% aqueous sodium bisulfite solution, water, 5% aqueous sodium bicarbonate solution and water, dried over sodium sulfate and concentrated. The residue is chromatographed on 175 g. of Florisil and eluted with 4:1 petroleum ether-ether to give 1-linolenoyl-2-(1-adamantoyl)glycerol-L-3-iodohydrin.

By the procedure of Example 6, the above prepared 1-linolenoyl-2-(1-adamantoyl)glycerol-L-3-iodohydrin is treated with silver t-butyl (N-t-butyloxycarbonyl-2-aminoethyl)phosphate and the resulting intermediate is dissolved in dry ether and treated with dry hydrogen chloride and then passed through a weakly basic anion exchange resin column (hydroxyl form) to give 1-linolenoyl-2-(1-adamantoyl)-3-sn-phosphatidylethanolamine.

EXAMPLE 8

By the procedure of Example 2 using decanoyl chloride in place of 7-palmitoleoyl chloride, the product is 1-(1 - adamantoyl)-2-decanoyl-3-sn-phosphatidylethanolamine.

Similarly, using 5,9-decadienoyl chloride in place of 7-palmitoleoyl chloride, the product is 1-(1-adamantoyl)-2-(5,9-decadienoyl)-3-sn-phosphatidylethanolamine.

EXAMPLE 9

By the procedure of Example 2 using 6,10,14-hexadecatrienoyl chloride (prepared by reacting 6,10,14-hexadecatrienoic acid with oxalyl chloride) in place of 7-palmitoleoyl chloride, the product is 1-(1-adamantoyl)-2-(6,10,14-hexadecatrienoyl) - 3 - sn-phosphatidylethanolamine.

EXAMPLE 10

By the procedure of Example 2 using 5,8,9-trimethyl-2,5,8-decatrienoyl chloride (prepared by reacting 5,8,9-trimethyl-2,5,8-decatrienoic acid with oxalyl chloride) in place of 7-palmitoleoyl chloride, the product is 1-(1-adamantoyl)-2-(5,8,9-trimethyl - 2,5,8 - decatrienoyl)-3-sn-phosphatidylethanolamine.

EXAMPLE 11

11.95 grams of a 60.2% mineral oil dispersion of sodium hydride is suspended in 300 ml. of dry dimethylsulfoxide. The mixture is heated in an oil bath at 65–70° C. for two hours under nitrogen. 1-benzylglycerol (54.6 g.) in 50 ml. of dry dimethylsulfoxide is added dropwise to the hot solution and the mixture is heated and stirred for two hours. A solution of 146.4 g. of 1-adamantylmethyl methylsulfonate (prepared from 1-adamantylmethanol and mesyl chloride in pyridine) in 100 ml. of dry dimethylsulfoxide is added and the mixture is heated at 95° C. for three days.

The reaction mixture is poured into ice water, extracted with ethyl acetate and washed with water. The extract is dried over sodium sulfate, concentrated and chromatographed on Florisil eluting with petroleum ether, petroleum ether-ether and ether to give 1,2-di(1-adamantylmethyl)-3-benzylglycerol.

The above prepared glycerol in ethyl acetate is hydrogenated in the presence of palladium at 25° C. for 24 hours to give after filtering and removing the solvent in vacuo 1,2-di(1-adamantylmethyl)glycerol.

According to the procedure of Example 1, 1,2-(1-adamantylmethyl)glycerol is reacted with dichloro N-(2,2,2-trichloroethoxycarbonyl)-2-aminoethyl phosphate and the resulting intermediate is treated with zinc and acetic acid to give 1,2-di(1-adamantylmethyl)-3-glycerophosphorylethanolamine.

EXAMPLE 12

Sodium hydride (11.95 g.) in a 60% suspension in mineral oil is suspended in 300 ml. of dry dimethylsulfoxide and the mixture is heated at 65–70° C. for two hours. To the solution is added 39.6 g. of 1,2-isopropylideneglycerol. The mixture is stirred at room temperature for two hours and then a solution of 12.2 g. of 1-adamantylmethyl methylsulfonate (prepared by reducing 1-adamantanecarboxylic acid with lithium aluminum hydride in ether and treating the resulting intermediate with mesyl chloride) in 60 ml. of dimethylsulfoxide is added. The mixture is heated at 50–95° C. for 48 hours, then poured into water and extracted with ethyl acetate. The extract is washed with water and chromatographed over Florisil eluting with ether-petroleum ether mixtures to give 1-(1-adamantylmethyl)-2,3-isopropylideneglycerol.

The above prepared 1-(1-adamantylmethyl)-2,3-isopropylideneglycerol is stirred with 3 N hydrochloric acid in 2:1 ether-methanol at room temperature to give 1-(1-adamantylmethyl)glycerol.

A mixture of 4.56 g. of 1-(1-adamantylmethyl)glycerol, 5.58 g. of trityl chloride, 2 ml. of pyridine and 35 ml. of chloroform is allowed to stand overnight at room temperature to give, after washing with dilute hydrochloric acid, dilute aqueous sodium bicarbonate solution and water, 1-(1-adamantylmethyl)-3-tritylglycerol.

A mixture of 1-(1-adamantylmethyl)-3-tritylglycerol and palmityl methylsulfonate (prepared lfrom 1-hexadecanol and mesyl chloride in pyridine) in dimethylsulfoxide is stirred at 50° C. for 24 hours, then water is added and the mixture is extracted with ethyl acetate. The extract is chromatographed on Florisil to give 1-(1-adamantylmethyl)-2-palmityl-3-tritylglycerol.

A mixture of 3 g. of 1-(1-adamantylmethyl)-2-palmityl-3-tritylglycerol, 5 g. of boric acid and 25 ml. of trimethyl borate is heated for 30 minutes. The mixture is concentrated in vacuo and the residue is partitioned between ethyl acetate and water. The ethyl acetate extract is washed wih water and chromatographed to give 1-(1-adamantylmethyl)-2-palmitylglycerol.

By the procedure of Example 1, 1-(1-adamantylmethyl)-2-palmitylglycerol is reacted with dichloro N-(2,2,2-trichloroethoxycarbonyl)-2-aminoethyl phosphate and the resulting intermediate is treated with zinc and acetic acid to give 1-(1-adamantylmethyl)-2-palmityl-3-glycerophosphorylethanolamine.

EXAMPLE 13

A mixture of 1-(1-adamantylmethyl)-3-tritylglycerol, prepared as in Example 12, and an equimolar amount of palmitoyl chloride in chloroform containing pyridine is stirred at room temperature for 18 hours. The mixture is diluted with ether, washed with dilute hydrochloric acid, water, aqueous sodium bicarbonate solution and water and then dried and concentrated to give 1-(1-adamantylmethyl)-2-palmitoyl-3-tritylglycerol. The trityl group is removed by heating with boric acid and trimethyl borate by the procedure of Example 12 to give 1-(1-adamantylmethyl)-2-palmitoylglycerol which is purified by chromatography on acid-washed Florisil containing 10–15% boric acid and eluting with ether-hexane mixtures.

By the procedure of Example 1, 1-(1-adamantylmethyl)-2-palmitoylglycerol is reacted with dichloro N-(2,2,2-trichloroethoxycarbonyl)-2-aminoethyl phosphate and the resulting intermediate is treated with zinc and acetic acid to give 1 - (1 - adamantylmethyl)-2-palmitoyl-3-glycerophosphorylethanolamine.

EXAMPLE 14

According to the procedure of Example 3, 1-(1-adamantylmethyl) - 2 - palmitoyl - 3 - glycerophosphorylethanolamine, prepared as in Example 13, is treated with phospholipase "A" to give 1-(1-adamtylmethyl)-3-glycerophosphorylethanolamine.

EXAMPLE 15

Sodium hydride (11.95 g.) in a 60% suspension in mineral oil is suspended in 300 ml. of dry dimethylsulfoxide and the mixture is heated at 65–70° C. for two hours. To the solution is added 54 g. of 1,3-benzylideneglycerol. The mixture is stirred at room temperature for two hours and then a solution of 23.2 g. of β-1-adamantylethyl methylsulfonate in 75 ml. of dimethylsulfoxide is added. The mixture is stirred at room temperature and worked up as in Example 12 to give 2-(β-1-adamantylethyl)-1,3-benzylideneglycerol.

The above prepared 2-(β-1-adamantylethyl)-1,3-benzylideneglycerol is heated at reflux with 50 ml. of methanol and 3 ml. of concentrated hydrochloric acid for one hour. The mixture is diluted with water and extracted with ether. The ether extract is concentrated to give 2-(β-1-adamantylethyl)glycerol.

A mixture of 2-(β-1-adamantylethyl)glycerol and nine-tenths of a molar equivalent of stearoyl chloride in chloroform with pyridine as an acid acceptor is stirred at room temperature for 24 hours. The mixture is diluted with ether, washed with dilute hydrochloric acid, water, 5% aqueous sodium bicarbonate solution and water, then dried, concentrated and chromatographed to give 1-stearoyl-2-(β-1-adamantylethyl)glycerol.

By the procedure of Example 1, 1-stearoyl-2-(β-1-adamantylethyl)glycerol is reacted with dichloro N-(2,2,2-trichloroethoxycarbonyl)-2-aminoethyl phosphate and the resulting intermediate is treated with zinc and acetic acid to give 1-stearoyl-2-(β-1-adamantylethyl)-3-glycerophosphorylethanolamine.

EXAMPLE 16

Sodium hydride (11.95 g.) in a 60% suspension in mineral oil is suspended in 300 ml. of dry dimethylsulfoxide and the mixture is heated at 65–70° C. for two hours. To the solution is added 38.1 g. of 2-(β-1-adamantylethyl)glycerol, prepared as in Example 15, and the resulting mixture is stirred at room temperature for two hours. A solution of 26.2 g. of stearyl methylsulfonate in 100 ml. of dimethylsulfoxide is added. The mixture is stirred at room temperature and worked up as in Example 12 to give 1-stearyl-2-(β-1-adamantylethyl)glycerol.

By the procedure of Example 1, 1-stearyl-2-(β-1-adamantylethyl)glycerol is converted to 1-stearyl-2-(β-1-adamantylethyl)-3-glycerophosphorylethanolamine.

EXAMPLE 17

Sodium hydride (7.2 g.) in a 60% suspension in mineral oil is suspended in 200 ml. of dry dimethylsulfoxide. The mixture is heated at 65–70° C. for two hours. 1-adamantanol (46.3 g.) is added and the resulting mixture is stirred at room temperature for 30 minutes. To the mixture is added 75.8 g. of 1-p-toluenesulfonyl-2,3-isopropylideneglycerol (prepared by reacting 1,2-isopropylideneglycerol with p-toluenesulfonyl chloride) in 100 ml. of dimethylsulfoxide. The resulting mixture is heated with stirring at 65° C. for two hours, then poured into water and extracted with ether acetate. The extract is washed with water and chromatographed over Florisil eluting with ether-petroleum ether mixtures to give 1-(1-adamantyl)-2,3-isopropylideneglycerol.

The above prepared 1-(1-adamantyl)-2,3-isopropylideneglycerol is stirred with 3 N hydrochloric acid in 2:1 ether-methanol at room temperature to give 1-(1-adamantyl)glycerol.

A mixture of 1-(1-adamantyl)glycerol, trityl chloride, pyridine and chloroform is allowed to stand for 18 hours at room temperature to give, after working up as in Example 12, 1-(1-adamantyl)-3-tritylglycerol.

A mixture of 1-(1-adamantyl)-3-tritylglycerol and an equimolar amount of palmitoyl chloride is stirred at room temperature for 18 hours. Working up as in Example 13 and removing the trityl group using boric acid and trimethyl borate by the procedure of Example 12 gives 1-(1-adamantyl)-2-palmitoylglycerol.

By the procedure of Example 1, 1-(1-adamantyl)-2-palmitoylglycerol is reacted with N-(2,2,2-trichloroethoxycarbonyl)-2-aminoethyl phosphate and the resulting intermediate is treated with zinc and acetic acid to give 1-(1 - adamantyl) - 2 - palmitoyl-3-glycerophosphorylethanolamine.

EXAMPLE 18

By the procedure of Example 3, 1-(1-adamantyl)-2-palmitoyl-3-glycerophosphorylethanolamine, prepared as in Example 17, is treated with phospholipase "A" to give 1-(1-adamantyl)-3-glycerophosphorylethanolamine.

EXAMPLE 19

A suspension of 1.35 g. of 2-phthalimidoethylphosphonic acid in 25 ml. of thionyl chloride and three drops of dimethylformamide is stirred at room temperature overnight. The excess thionyl chloride is evaporated off and the residue is azeotroped with dry benzene, then dissolved in 50 ml. of dry chloroform and a solution of 2.0 g. of 1,2-di(1-adamantoyl)-sn-glycerol (prepared as in Example 1), 1.75 ml. of dry pyridine and 25 ml. of dry chloroform is added dropwise at 0° C. The mixture is stirred at room temperature overnight, then diluted with 200 ml. of ether, washed with dilute hydrochloric acid and brine, dried over sodium sulfate and concentrated to give the 2,3-di(1-adamantoyloxy-propyl ester of 2-phthalimidoethylphosphonic acid.

The above prepared phosphonic acid ester is dissolved in 50 ml. of 95% ethanol, treated with 1.75 ml. of 50% aqueous hydrazine and stirred at room temperature overnight. The mixture is concentrated and the residue is stirred with chloroform and filtered. The filtrate is concentrated, chromatographed on 250 g. of 2:1 silica gel-Super-Cel and recrystallized from chloroform-ether to give the 2,3-di(1-adamantoyloxy)propyl ester of 2-aminoethylphosphonic acid.

EXAMPLE 20

A solution of 14.5 g. of 1,2-diadamantoyl-sn-glycerol (prepared as in Example 1) in 35 ml. of dry chloroform and 21 ml. of dry triethylamine is added dropwise to a solution of 25.5 g. of the 2-bromoethyl ester of dichloro phosphoric acid in 14 ml. of dry chloroform at 0–5° C. with stirring. The mixture is allowed to stand overnight in the refrigerator, then stirred for two hours and concentrated at room temperature. To the mixture 150 ml. of 0.1 N aqueous potassium chloride solution and 40 ml. of 10:1 ether-methanol are added at 0° C. with stirring for one hour. The mixture is diluted with 800 ml. of ether and acidified with two drops of concentrated hydrochloric acid to pH 2. The ether solution is washed with water, dried over sodium sulfate and concentrated and the residue is azeotroped with benzene to give 1,2-di(1-adamantoyl)-3-sn-glycero-(2-bromoethyl)phosphoric acid.

A solution of 20 g. of dry gaseous trimethylamine in 200 ml. of 2-butanone is added to 21 g. of 1,2-di(1-adamantoyl)-3-sn-glycero-(2 - bromoethyl)phosphoric acid and the mixture is stirred at 50° C. for 18 hours, then concentrated to one-half of its original volume, refrigerated, filtered and dried in vacuo to give 2-[1,2-di(1-adamantoyl) - 3 - sn-phosphatidyl]ethyl(trimethyl)ammonium bromide.

Silver carbonate (19 g.) is added to a solution of 13 g. of the above prepared phosphatidylethyl(trimethyl)-ammonium bromide with stirring for three hours. The mixture is filtered and percolated through a column packed with a 1:1 mixture of weakly basic anion exchange resin (hydroxyl form) and weakly acidic cation exchange resin, eluting with chloroform-methanol to give, after removing the solvent in vacuo, a solid product which is recrystallized from chloroform-2-butanone-absolute ethanol to give 1,2-di(1-adamantoyl)-3-sn-phosphatidylcholine.

EXAMPLE 21

By the procedure of Example 20, 1,2-di(1-adamantoyl)-3-sn-glycero-(2-bromoethyl)phosphoric acid is reacted with triethylamine to give 2-[1,2-di(1-adamantoyl)-3-sn-phosphatidyl]ethyl(triethyl)ammonium bromide which is then converted by the procedure of Example 20 to 2-[1,2 - di(1-adamantoyl)-3-sn-phosphatidyl]ethyl(triethyl) ammonium hydroxide.

By the same procedure, using tributylamine in place of triethylamine, the product is 2-[1,2-di(1-adamantoyl)-3-sn-phosphatidyl]ethyl(tributyl)ammonium hydroxide.

EXAMPLE 22

A mixture of 1,2-di(1-adamantoyl)-3-sn-glycero(2-bromoethyl)phosphoric acid and methylamine in 2-butanone is stirred at 50° C. for 18 hours. Working up as in Example 20 gives N-methyl-1,2-di(1-adamantoyl)-3-sn-phosphatidylethanolamine.

Similarly, using in place of methylamine the following:

ethylamine
butylamine
dimethylamine
dipropylamine
dibutylamine the products are, respectively:

N-ethyl-1,2-di(1 - adamantoyl)-3-sn-phosphatidylethanolamine

N-butyl-1,2-di(1 - adamantoyl)-3-sn-phosphatidylethanolamine

N,N-dimethyl-1,2-di(1-adamantoyl) - 3 - sn-phosphatidylethanolamine

N,N-dipropyl - 1,2 - di(1-adamantoyl)-3-sn-phosphatidylethanolamine

N,N-dibutyl-1,2-di(1 - adamantoyl)-3-sn-phosphatidylethanolamine.

EXAMPLE 23

A suspension of 3.67 g. of a 60.2% mineral oil dispersion of sodium hydride in tetrahydrofuran is dissolved by the portionwise addition of 17.9 ml. of diethyl phosphonate with stirring under reflux. To the solution is added about 7.3 g. of 1,2-di(1-adamantylmethyl)-3-(p-toluenesulfonyl)glycerol [prepared by reacting 1,2-di(1-adamantylmethyl)glycerol, prepared as in Example 11, with p-toluenesulfonyl chloride in pyridine] in 25 ml. of tetrahydrofuran. The mixture is refluxed overnight. The reaction mixture is concentrated under reduced pressure and the residue is dissolved in ether and water and acidified with dilute hydrochloric acid. The aqueous phase is extracted twice with ether. The combined ether extracts are washed with water, dried and concentrated to give the diethyl ester of 2,3-di(1-adamantylmethyloxy)-1-propylphosphonic acid.

A mixture of 12 g. of the diethyl ester of 2,3-di(1-adamantylmethyloxy)-1-propylphosphonic acid, 40 ml. of ethanol and 40 ml. of 20% aqueous sodium hydroxide is refluxed for 30 hours. The reaction mixture is concentrated and the aqueous phase is extracted with ether. The aqueous phase is acidified, extracted with 4:1 ethyl acetate-chloroform and the organic extract is washed with brine, dried over sodium sulfate and concentrated. The residue is dissolved in acetone and treated with cyclohexylamine until basic, then cooled to —30° C. overnight and filtered. To the solid material is added 20 ml. of ethanol. The mixture is filtered and the filtrate is concentrated to a small volume and diluted with acetone containing 1% cyclohexylamine. The solution is cooled and filtered. The solid material is recrystallized from ethanolacetone-1% cyclohexylamine to give 2,3-di(1-adamantylmethyloxy)-1-propylphosphonic acid.

2,3-di(1-adamantylmethyloxy) - 1 - propylphosphonic acid (642 mg.) and 734 mg. of N-(2,2,2-trichloroethoxycarbonyl)ethanolamine are dissolved in 20 ml. of pyridine and 4 ml. of trichloroacetonitrile. The resulting mixture is heated at 50° C. for 30 hours, then concentrated in vacuo. The residue is diluted with water and extracted with ether and the ether extract is washed with water and then concentrated in vacuo. The residue is stirred in 20 ml. of 95% acetic acid with 2 g. of activated zinc for 24 hours. Solid sodium bicarbonate (equimolar amount to the acetic acid) and 10 ml. of water are added and the mixture is stirred for 30 minutes, then diluted to 1 liter with chloroform, dried over sodium sulfate, filtered, concentrated in vacuo and then chromatographed on 2:1 silica gel-Super-Cel, eluting with 9:1 to 7:3 chloroform-methanol mixtures to give the 2-aminoethyl ester of 2,3-di(1-adamantylmethoxy)-1-propylphosphonic acid.

EXAMPLE 24

A suspension of 2.37 g. of 2-phthalimidoethylphosphonic acid in 25 ml. of thionyl chloride and three drops of dimethylformamide is stirred at room temperature overnight. The excess thionyl chloride is evaporated off and the residue is azeotroped with dry benzene. The dichloro compound is dissolved in 50 ml. of dry chloroform and a solution of 3.5 g. of 1,2-di($\beta$-1-adamantylethyl)glycerol (prepared by reacting 1-benzylglycerol with two molar equivalents of $\beta$-1-adamantylethyl methylsulfonate which is prepared from 1-adamantaneethanol and mesyl chloride in pyridine), 2.65 ml. of dry pyridine and 50 ml. of dry chloroform is added dropwise at 0° C. The mixture is stirred at room temperature for 18 hours, diluted with ether, washed with dilute hydrochloric acid and brine, dried over sodium sulfate and concentrated to give the 2,3-di($\beta$-1-adamantylethyloxy)propyl ester of 2-phthalimidoethylphosphonic acid.

The above prepared phosphonic acid ester is dissolved in 50 ml. of 95% ethanol. To the ethanol solution is added 2.43 ml. of 50% aqueous hydrazine and the resulting mixture is stirred at room temperature overnight, then concentrated. The residue is stirred with chloroform, filtered and the filtrate is concentrated. The residue is chromatographed on 250 g. of 2:1 silica gel-Super-Cel to give the 2,3-di($\beta$-1-adamantylethyloxy)propyl ester of 2-aminoethylphosphonic acid.

EXAMPLE 25

By the procedure of Example 2 using, in place of 7-palmitoleoyl chloride, the following:

acetyl chloride
propionyl chloride
caproyl chloride
crotonoyl chloride
3-butenoyl chloride
5-hexenoyl chloride
4-hexenoyl chloride the following products are obtained, respectively:

1-(1-adamantoyl)-2-acetyl-3 - sn-phosphatidylethanolamine 1-(1-adamantoyl) - 2-propionyl - 3-sn-phosphatidylethanolamine 1-(1-adamantoyl) - 2 - caproyl-3-sn - phosphatidylethanolamine 1-(1-adamantoyl) - 2 - crotonoyl-3-sn-phosphatidylethanolamine 1-(1-adamantoyl) - 2 - (3-butenoyl)-3-sn-phosphatidylethanolamine 1-(1-adamantoyl) - 2 - (5-hexenoyl)-3-sn-phosphatidylethanolamine 1-(1-adamantoyl) - 2 - (4-hexenoyl)-3-sn-phosphatidylethanolamine.

EXAMPLE 26

By the procedure of Example 5 using, in place of 1-oleoylglycerol - L-3-iodohydrin, the following 1-substituted-glycerol-L-3-iodohydrins, prepared from the alkanoyl or alkenoyl chloride (which is prepared by reacting the alkanoic or alkenoic acid with oxalyl chloride) and glycerol-L-1-iodohydrin by the procedure described for the preparation of 1-adamantoylglycerol-5-3-iodohydrin in Example 2:

1-hexacosanoylglycerol-L-3-iodohydrin
1-(2-hexacosenoyl)glycerol-L-3-iodohydrin the following products are obtained, respectively:

1-hexacosanoyl-2-(1 - adamantoyl)-3-sn - phosphatidylethanolamine
1-(2-hexacosenoyl) - 2-(1 - adamantoyl) - 3-sn-phosphatidylethanolamine.

EXAMPLE 27

A mixture of 48.3 g. of 1-(1-adamantylmethyl)-3-trityl-glycerol, 25 g. of silver oxide and 75 g. of methyl iodide in 100 ml. of dimethylsulfoxide is stirred at 60° C. for two hours. Water is added and the mixture is filtered. The filtrate is extracted with benzene-ether and the extract is chromatographed on Florisil to give 1-(1-adamantylmethyl)-2-methyl-3-tritylglycerol. The trityl group is removed by the procedure of Example 12 to give 1-(1-adamantylmethyl)-2-methylglycerol.

By the procedure of Example 1, 1-(1-adamantylmethyl)-2-methylglycerol is reacted with dichloro N-(2,2,2-trichloroethoxycarbonyl)-2-aminoethyl phosphate and the resulting intermediate is treated with zinc and acetic acid to give 1-(1-adamantylmethyl)-2-methyl-3-glycerophosphorylethanolamine.

Similarly, using in place of methyl iodide, the following:

ethyl iodide
propyl bromide
hexyl chloride
4-chloro-1-butene
6-bromo-1-hexene
5-bromo-1-hexene the following products are obtained, respectively:

1-(1-adamantylmethyl)-2-ethyl - 3 - glycerophosphorylethanolamine
1-(1 - adamantylmethyl)-2-propyl-3-glycerophosphorylethanolamine
1-(1 - adamantylmethyl)-2-hexyl-3-glycerophosphorylethanolamine
1-(1-adamantylmethyl) - 2 - (3-butenyl)-3-glycerophosphorylethanolamine
1-(1 - adamantylmethyl)-2-(5-hexenyl)-3-glycerophosphorylethanolamine
1-(1 - adamantylmethyl)-2-(4-hexenyl)-3-glycerophosphorylethanolamine.

EXAMPLE 28

By the procedure of Example 5 using, in place of 1-oleoylglycerol-L-3-iodohydrin, the following 1-substituted glycerol-L-3-iodohydrins prepared from the alkanoyl or alkenoyl chloride and glycerol-L-1-iodohydrin by the procedure described for the preparation of 1-adamantoylglycerol-L-3-iodohydrin in Example 2:

1-acetylglycerol-L-3-iodohydrin
1-propionylglycerol-L-3-iodohydrin
1-butyrylglycerol-L-3-iodohydrin
1-hexanonylglycerol-L-3-iodohydrin
1-(3-butenoyl)glycerol-L-3-iodohydrin
1-(5-hexenoyl)glycerol-L-3-iodohydrin
1-(4-hexenoyl)glycerol-L-3-iodohydrin the following products are obtained, respectively:

1-acetyl-2-(1 - adamantoyl)-3-sn-phosphatidylethanolamine
1-propionyl - 2 - (1-adamantoyl)-3-sn-phosphatidylethanolamine
1-butyryl-2-(1 - adamantoyl)-3-sn-phosphatidylethanolamine
1-hexanoyl - 2 - (1-adamantoyl)-3-s-n-phosphatidylethanolamine
1-(3 - butenoyl)-2-(1-adamantoyl)-3-sn)phosphatidylethanolamine
1-(5-hexenoyl) - 2 - (1-adamantoyl)-3-sn-phosphatidylethanolamine
1-(4-hexenoyl) - 2 - (1-adamantoyl)-3-sn-phosphatidylethanolamine.

EXAMPLE 29

2-(1-adamantylmethyl)glycerol (prepared from 1,3-benzylideneglycerol and 1-adamantylmethyl methylsulfonate by the procedure of Example 15) is heated with an equimolar amount of methyl iodide with silver oxide in dimethylsulfoxide at 60° C. for two hours and the mixture is worked up by the procedure of Example 27 to give 1-methyl-2-(1-adamantylmethyl)glycerol.

By the procedure of Example 1, 1-methyl-2-(1-adamantylmethyl)glycerol is converted to 1-methyl-2-(1-adamantylmethyl)-3-glycerophosphorylethanolamine.

By the same procedure, using in place of methyl iodide the following:

ethyl iodide
butyl bromide
hexyl chloride
4-chloro-1-butene
6-bromo-1-hexene
5-bromo-1-hexene the following products are obtained, respectively:

1-ethyl - 2 - (1-adamantylmethyl)-3-glycerophosphorylethanolamine
1-butyl - 2 - (1-adamantylmethyl)-3-glycerophosphorylethanolamine
1-hexyl - 2 - (1-adamantylmethyl)-3-glycerophosphorylethanolamine
1-(3-butenyl) - 2 - (1-adamantylmethyl)-3-glycerophosphorylethanolamine
1-(5 - hexenyl)-2-(1-adamantylmethyl)-3-glycerophosphorylethanolamine
1-(4 - hexenyl)-2-(1-adamantylmethyl)-3-glycerophosphorylethanolamine.

EXAMPLE 30

By the procedure of Example 20, using dichloro 2-bromoethylphosphonic acid in place of the 2-bromoethyl ester of dichloro phosphoric acid, the product is the 2,3-di(1-adamantoyloxy)propyl ester of 2 - phosphonoethyl (trimethyl)ammonium hydroxide.

By the same procedure, using in place of trimethylamine the following:

methylamine
dimethylamine
ethylamine
dibutylamine the products are, respectively:

the 2,3 - di(1 - adamantoyloxy)propyl ester of 2-(N-methylamino)ethylphosphonic acid
the 2,3-di(1-adamantoyloxy)propyl ester of 2-(N,N-dimethylamino)ethylphosphonic acid
the 2,3-di(1-adamantoyloxy)propyl ester of 2-(N-ethylamino)ethylphosphonic acid
the 2,3-di(1-adamantoyloxy)propyl ester of 2-(N,N-dibutylamino)ethylphosphonic acid.

EXAMPLE 31

2,3-di(1-adamantylmethyloxy) - 1 - propylphosphonic acid is reacted with 2-methylaminoethanol in the presence of a 10 molar excess of trichloroacetonitrile with pyridine (to make the mixture basic) in acetonitrile with stirring at 50–100° C. for one to two days. Water is added and the mixture is acidified with dilute hydrochloric acid, then extracted with ether. The extract is chromatographed on silica gel-Super-Cel to give the 2 - N-methylaminoethyl ester of 2,3-di(1-adamantylmethyloxy) - 1 - propylphosphonic acid.

Similarly, using in place of 2-methylaminoethanol the following:

2-dimethylaminoethanol
2-propylaminoethanol
2-dibutylaminoethanol the following products are obtained, respectively:
the 2 - (N,N-dimethylamino)ethyl ester of 2,3-di(1-adamantylmethyloxy)-1-propylphosphonic acid
the 2-(N - propylamino)ethyl ester of 2,3-di(1-adamantylmethyloxy)-1-propylphosphonic acid
the 2 - (N,N-dibutylamino)ethyl ester of 2,3-di(1-adamantylmethyloxy)-1-propylphosphonic acid.

In addition, by the same procedure, using choline in place of 2-methylaminoethanol, the 2-(trimethylammonium hydroxide)ethyl ester of 2,3-di(1-adamantylmethyloxy)-1-propylphosphonic acid is obtained.

EXAMPLE 32

1-(1-adamantyl)-3-tritylglycerol (prepared as in Example 17) is reacted with p-toluenesulfonyl chloride and the resulting 1 - (1-adamantyl)-2-p-toluenesulfonyl-3-tritylglycerol is reacted with the sodium salt of 1-adamantanol by the procedure of Example 17. The resulting 1,2-di(1-adamantyl)-3-tritylglycerol is stirred with acetic acid on a steam bath for one hour. The mixture is then diluted with water and extracted with ether. The extract is washed with aqueous sodium bicarbonate solution and chromatographed on Florisil to give 1,2-di(1-adamantyl) glycerol.

By the procedure of Example 1, 1,2-di(1-adamantyl) glycerol is converted to 1,2-di(1-adamantyl)-3-glycerophosphorylethanolamine.

What is claimed is:

1. A compound of the formula:

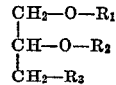

in which:

$R_1$ is 1-adamantoyl or 1-adamantyl —$(CH_2)_n$ and $R_2$ is alkanoyl having 2 to 16 carbon atoms or alkenoyl having 4 to 16 carbon atoms with from 1 to 3 non-conjugated carbon-carbon double bonds or $R_1$ is alkanoyl having 2 to 26 carbon atoms or alkenoyl having 4 to 26 carbon atoms with from 1 to 3 non-conjugated carbon-carbon double bonds and $R_2$ is 1-adamantoyl or 1-adamantayl —$(CH_2)_n$;

$n$ is 0 to 2;

$R_3$ is

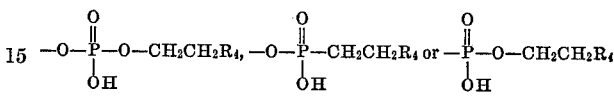

$R_4$ is

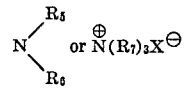

$R_5$ and $R_6$ are hydrogen or lower alkyl
$R_7$ is lower alkyl and
X is a pharmaceutically acceptable anion.

2. A compound according to claim 1 in which $R_1$ is 1-adamantoyl; $R_2$ is 10-undecenoyl and $R_3$ is

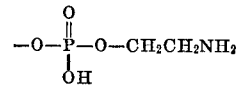

References Cited
UNITED STATES PATENTS

| | | | |
|---|---|---|---|
| 3,577,446 | 5/1971 | Rakhit et al. | 260—403 |
| 3,681,412 | 8/1972 | Betzing | 260—403 |

ELBERT L. ROBERTS, Primary Examiner

PO-1050
(5/69)

UNITED STATES PATENT OFFICE
CERTIFICATE OF CORRECTION

Patent No. 3,772,360          Dated November 13, 1973

Inventor(s) Francis R. Pfeiffer and Jerry A. Weisbach

It is certified that error appears in the above-identified patent and that said Letters Patent are hereby corrected as shown below:

Column 3, lines 71-72, "incoporated" should read --- incorporated ---.

Column 4, lines 10-14, that portion of the formula reading

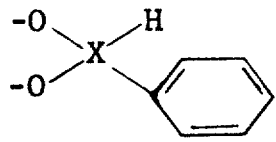    should read    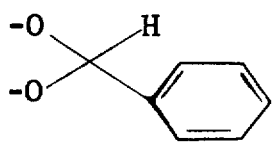 .

Column 4, lines 63-68, the formula should appear as follows:

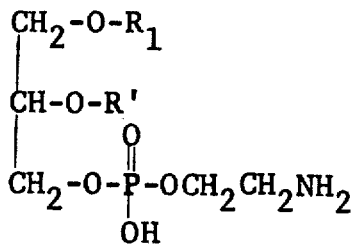 .

Column 5, line 2, "glycerophosphoylethanolamine" should read --- glycerophosphorylethanolamine ---; line 19, "glycerophosphoylethanolamine" should read --- glycerophosphorylethanolamine ---.

Column 5, lines 21-23, that portion of the left-hand formula reading

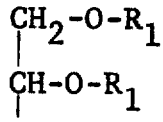    should read    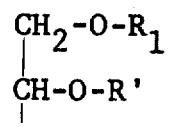 .

Column 5, lines 24-30, that portion of the formula reading

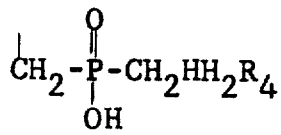    should read    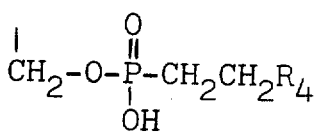

Page 2.

PO-1050
(5/69)

UNITED STATES PATENT OFFICE
CERTIFICATE OF CORRECTION

Patent No. 3,772,360  Dated November 13, 1973

Inventor(s) Francis R. Pfeiffer and Jerry A. Weisbach

It is certified that error appears in the above-identified patent and that said Letters Patent are hereby corrected as shown below:

Column 5, line 61, that portion of the structural formula reading $-(O)_m CH_2 CH_2 B$ should read $-(O)_m CH_2 CH_2 Br$.

Column 6, line 22, "glycerophosphoyl" should read --- glycerophosphoryl ---; line 52, "225°C." should read --- 25°C. ---; line 59, cancel "concentrated at 25°C. and then dissolved in" and insert --- filtered and concentrated at 25°C. The residue ---; line 68, "chlorform" should read --- chloroform ---.

Column 7, line 12, insert a comma between "solution" and "water".

Column 10, line 40, "wih" should read --- with ---; line 74, (1-adamtylmethyl) should read (1-adamantylmethyl).

Column 11, line 60, "ether" should read --- ethyl ---.

Column 12, line 28, "-propyl" should read --- )propyl ---.

Column 15, line 72, "s-n" should read --- sn ---.

Column 18, line 9, 1-adamantayl-$(CH_2)_n$ should read 1-adamantyl-$(CH_2)_n$.

Signed and sealed this 16th day of July 1974.

(SEAL)
Attest:

McCOY M. GIBSON, JR.
Attesting Officer

C. MARSHALL DANN
Commissioner of Patents